United States Patent [19]
Kissel

[11] 3,749,974
[45] July 31, 1973

[54] ELECTRONIC IGNITION CONTROLLER

[75] Inventor: William R. Kissel, Taylor, Mich.

[73] Assignee: Chrysler Corporation, Highland Park, Mich.

[22] Filed: June 1, 1971

[21] Appl. No.: 148,354

[52] U.S. Cl..... 315/209 T, 123/148 E, 315/209 SC, 315/209 R
[51] Int. Cl............................................. F02p 9/00
[58] Field of Search .............................. 123/148 E; 315/209 R, 209 T, 209 CD, 209 SC

[56] References Cited
UNITED STATES PATENTS
3,473,061 10/1969 Soehner...................... 123/148 E X
3,496,921 2/1970 Boyer............................ 315/209 SC Primary Examiner—Roy Lake
Assistant Examiner—Lawrence J. Dahl
Attorney—Talburtt and Baldwin

[57] ABSTRACT

A magnetically-triggered, electronic ignition control unit, which provides an anti-dwell ignition firing period that varies inversely with engine speed. The low speed anti-dwell portion of the ignition cycle is of prolonged or sufficient duration for minimum vehicle exhaust emissions, and the high speed dwell portion of the ignition cycle is of sufficient duration for efficient charging of the high inductance, low turns ratio form of ignition coil as is employed with a breaker type ignition system.

31 Claims, 5 Drawing Figures

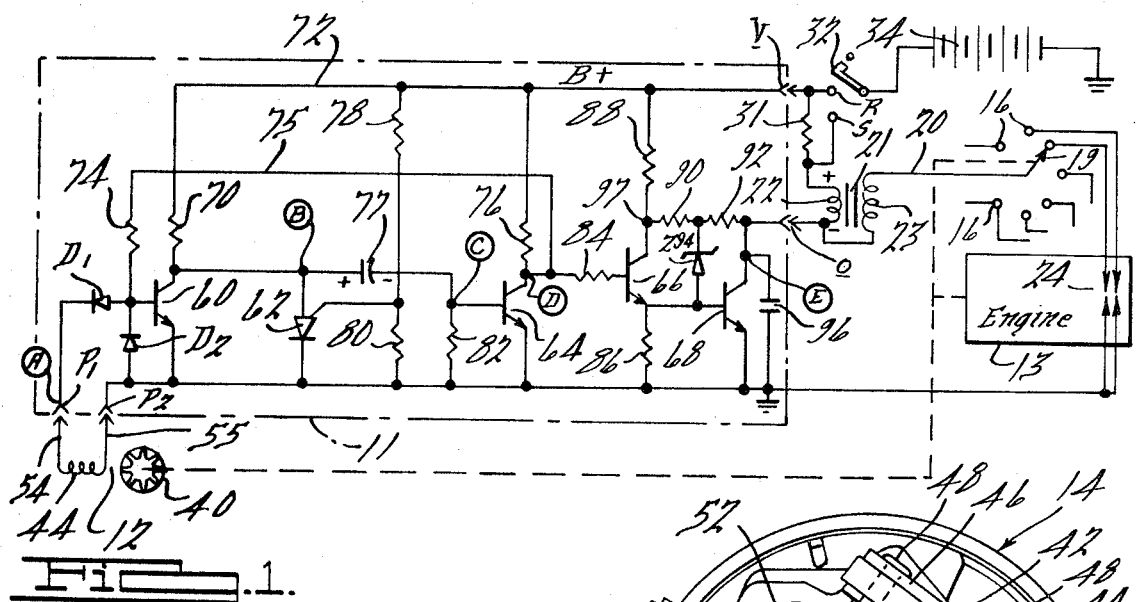
FIG. 1.
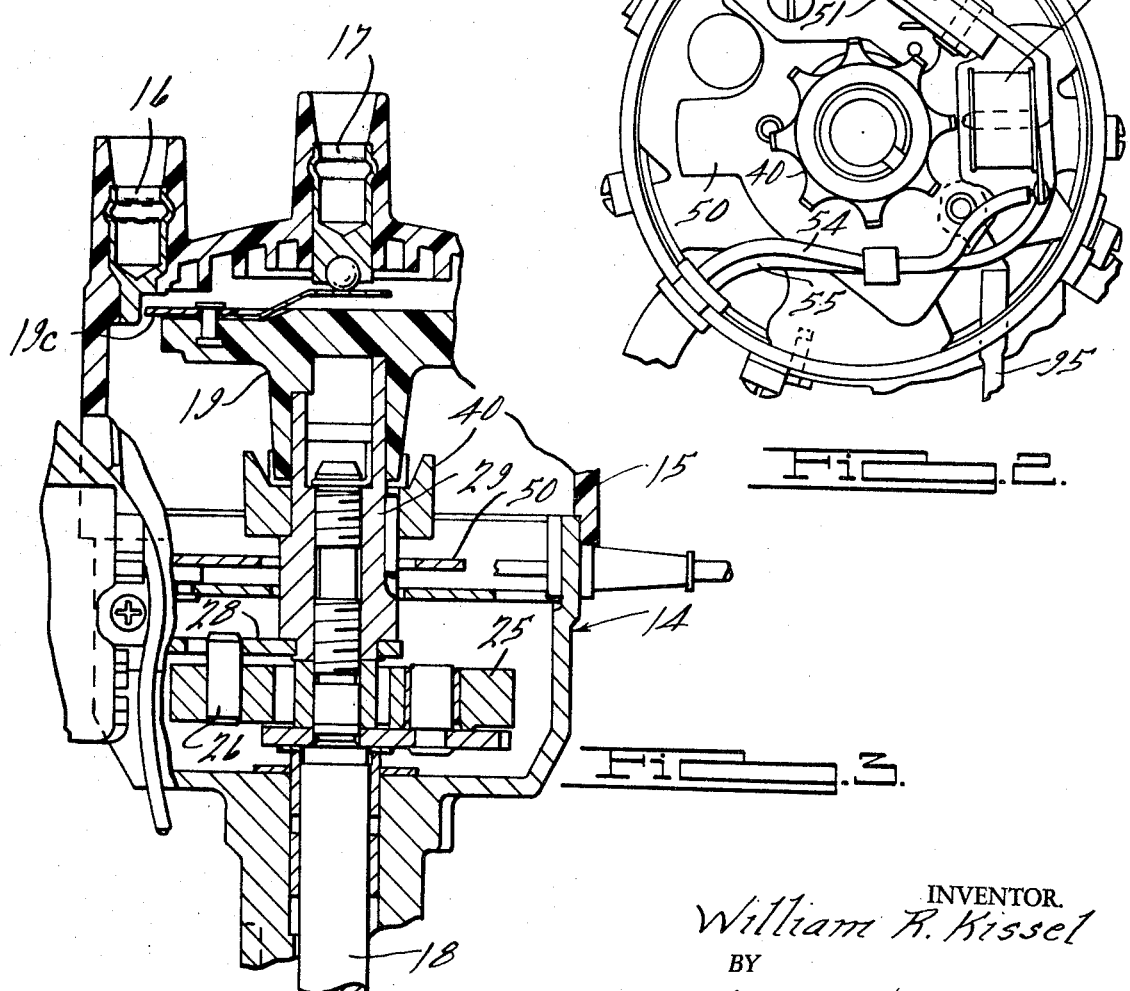
FIG. 2.
FIG. 3.
INVENTOR.
William R. Kissel
BY
Talburtt & Baldwin
ATTORNEYS.

Volt Limited By 294
(No Load on Coil)

INVENTOR.
William R. Kissel
BY Talburtt & Baldwin
ATTORNEYS.

ELECTRONIC IGNITION CONTROLLER

BACKGROUND OF THE INVENTION

Most prior forms of electronic ignition controllers provide a fixed period for the anti-dwell or firing portion of the ignition cycle and are triggered from a voltage signal developed by an engine driven pick-up device. In consequence of the fixed anti-dwell period provided by the aforementioned controllers, either the anti-dwell portion of the ignition cycle is too short for minimum vehicle exhaust emissions at low speed operation of the engine or the high speed dwell portion of the ignition cycle is too short to permit efficient charging of the standard form of ignition coil now employed with contact-breaker systems. In order to charge the coil to a sufficient energy level from the vehicle power source at high speed operation of the engine, such controllers use a special coil with a reduced number of primary turns thereon. Although this expedient results in a reduced coil time constant, the reduction in the primary turns decreases the coil inductance and requires an increased level of current to be drawn thereby, increasing the power consumption of the system.

Where the pick-up device is of a magnetic character, the inductance of the pick-up coil introduces a triggering delay or timing lag, which increases with engine speed, and adversely affects the timing of the system. Moreover, the triggering sensitivity and timing of such prior forms of electronic ignition systems may also be adversely affected by supply voltage variations.

SUMMARY OF THE INVENTION

The present invention seeks generally to provide an improved form of electronic ignition controller, which does not comprise the selection of the low speed anti-dwell portion and the high speed dwell portion of the ignition cycle and which avoids the above-mentioned and other disadvantages of such prior forms of magnetically triggered, electronic ignition controllers, while providing the manifold advantages of electronic breaker-less ignition systems.

Specifically the invention seeks to provide an improved form of electronic, breaker-less ignition controller which is of solid-state, relatively inexpensive design; which employs a conventional ignition coil of the high inductance, low turns ratio type presently used with contact breaker ignition systems and is characterized by low current and power drain from the vehicle electrical power source; which has an anti-dwell period characteristic that varies inversely with engine speed and a triggering sensitivity characteristic that varies inversely with supply voltage; which is characterized by minimum timing lag and delay, although using a magnetic form of pick-up; and which affords optimum protection to the semi-conductors and components of the system from misconnections to the supply source and from the damaging effects of arcing within the distributor cap to the pickup coil and the leads thereof and from the damaging effects under no-load, open circuit ignition coil conditions.

In accordance with the invention there is provided a magnetically-triggered electronic control unit, which features a variable period form of univibrator circuit connected between a triggering input stage and a pre-driver switching stage coupled to the output switching stage of the control unit. The univibrator includes a storage capacitor, which is connected between the triggering input stage and the predriver stage, and a voltage conduction latching device, which is connected across the output of the triggering stage. The capacitor is discharged through a resistor connected across the input electrodes of the predriver stage and through the voltage conduction latching device when the charge on the capacitor has attained a predetermined level, the discharge circuit having a time constant which is on the order of or greater than the period between successive trigger signals at high speed operation of the engine and is less than the period between successive trigger signals at low speed operation of the engine.

A diode is connected in circuit with the pick-up coil to prevent current flow therein prior to triggering in order to minimize timing lag and delay caused by the use of a magnetic pick-up, the particular form of diode circuit employed serving also to protect the semiconductor triggering input stage from the damaging effects of arcing to the pick-up coil or the leads thereof within the distributor cap. A Zener diode is connected in circuit between the control input and an output electrode of the output switching stage to protect the semiconductor component thereof from the excessive voltage appearing at the output element during open circuit ignition coil conditions.

The manner of accomplishment of the above and other objects of the invention will appear more fully from consideration of the following detailed description of the preferred embodiment of the invention made with reference to the accompanying drawings.

DESCRIPTION OF THE DRAWINGS

FIG. 1 is a schematic electrical circuit diagram of the electronic ignition controller of the present invention;

FIG. 2 is a top plan view of a distributor housing the magnetic pick-up unit employed with the electronic control unit of the present invention;

FIGS. 4 and 5 are wave forms of the voltage wave shapes occurring at variously identified points in the circuit of FIG. 1.

DESCRIPTION OF THE PREFERRED EMBODIMENT

Figure 4:
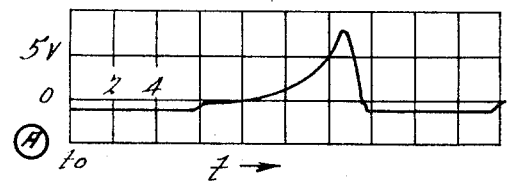
Figure 4:
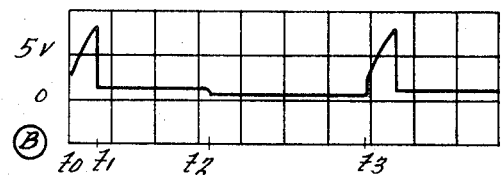
Figure 4:
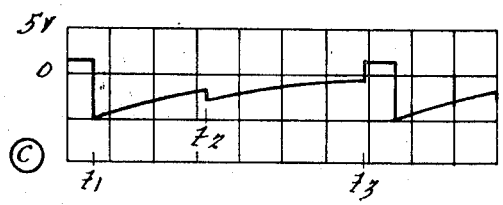
Figure 4:
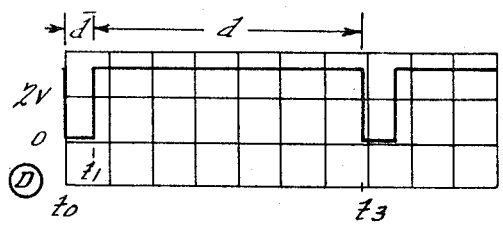
Figure 4:
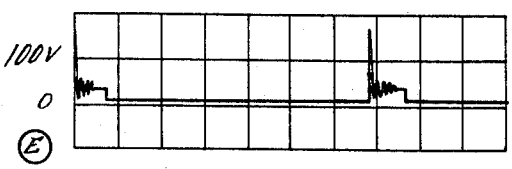

With reference to the drawings, the subject ignition system 10 comprises an electronic control unit 11 and a magnetic pick-up 12, which replace the electromechanical breaker points employed in the conventional ignition system of an internal combustion engine. The engine, shown at 13, has a distributor 14, a standard ignition coil 21 having a primary winding 22 and a secondary winding 23, and a plurality of spark plugs 24, one for each of the cylinders of the engine.

Figure 3:
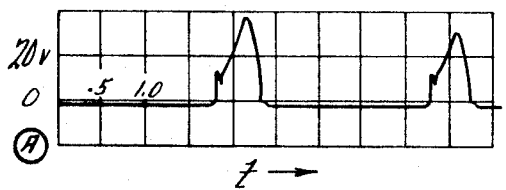
FIG. 3 is a side elevation view of a part of the distributor housing the magnetic pick-up unit employed with the electronic control unit of the present invention.
Figure 3:
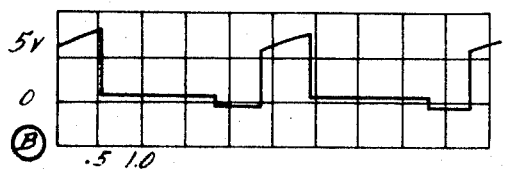
Figure 3:
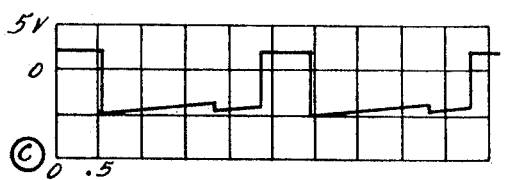
Figure 3:
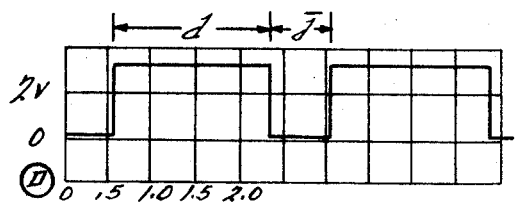
Figure 3:
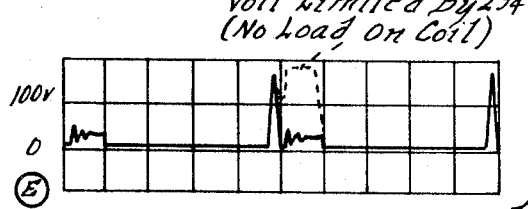

One side of each of the plugs is electrically grounded and the other side connected to a different one of a plurality of arcuately spaced, stationary terminals 16 located in the removable cap 15 of the distributor shown in FIG. 3. The distributor rotor 18 is driven at its lower end from the engine cam shaft (not shown) and has an angularly adjustable sleeve 29 at its upper end on which is mounted a rotor arm 19. Arm 19 has an electrical blade 19c thereon, which is in sliding rotary contact with the central terminal hub 17 of the distributor cap that is connected over conductor 20 to one side of the ignition coil secondary winding 23. High tension energy is thus successively distributed sequentially to the plugs through the rotor contact arm 19c located in spaced close proximity to the circular row of terminals 16.

The other side of the ignition coil secondary winding is connected internally of the coil housing to one side of the primary winding, shown in FIG. 1 as the negative terminal, of the coil. The positive terminal of the ignition coil, shown as taken from the other side of the primary winding, is externally connected through a ballast resistor 31 and the vehicle ignition switch 32 to the positive terminal of a source of electrical energy, which includes the vehicle storage battery 34, shown connected as a negatively grounded system. At its negative side or terminal, the ignition coil 21 is externally connected to the output terminal O of the case-grounded electronic control unit 11. Also provided on the control unit 11 are a supply terminal V, which is connected to the ignition run contact R of the ignition switch 32, and a pair of input terminals P1 and P2 which are connected to the coil 44 of the magnetic pick-up or signal generator unit 12.

Pick-up 12 is located in the upper portion of the distributor 14, which is of the general type shown in U.S. Pat. No. 2,688,055 equipped with vacuum advance and governor advance mechanism for changing the ignition timing in accordance with engine vacuum and speed. As shown in FIG. 2, the pick-up unit comprises a toothed reluctor wheel 40, a permanent magnet 42 and a pick-up coil 44 of which the magnet and coil constitute the stator portion of the pick-up unit and are mounted on a movable timing plate also shown at 50 in the above patent. Reluctor rotor wheel 40, which has one tooth for each spark plug or engine cylinder and is formed of magnetically permeable material, is keyed to the adjustable sleeve portion 29 on the upper end of the distributor rotor shaft 18, which has been modified to remove the breaker cam shown at 30 in the above patent. Adjustable sleeve 29, which forms a part of the governor advance mechanism, carries a slotted plate 28 at its lower end through which it is coupled by pins 26 to the centrifugally actuated governor weights 25 to adjust the position of the reluctor wheel 40 angularly relative to the distributor rotor 18, as well as to the pick-up coil, in accordance with engine speed.

Magnet 42 and the pick-up coil 44 are carried on a bent pole piece 46, one portion of which carries the pick-up coil 44 and another portion the magnet 42. The magnet 42, which is shown as a flat bar magnet, is secured to the pole piece as by rivet eyelets 48 extending therethrough from an upstanding mounting bracket 51, which is attached by screws 52 to the aforementioned movable timing plate on which the distributor breaker point assembly was previously mounted. As the breaker plate 50 is directly coupled through link 95 to suitable vacuum advance mechanism in the manner of the distributor of the above patent, the position of the pick-up coil and magnet assembly may be advanced or retarded relative to the reluctor wheel on the distributor rotor to accomplish automatic spark advance with the same centrifugal and vacuum advance mechanism used with the conventional distributor breaker point assembly.

The pick-up unit 12 generates bi-polar alternating voltage signals, corresponding in number to the number of reluctor teeth passing the pick-up coil for each revolution of the distributor rotor shaft, which is rotating at half of the engine speed. These signals are supplied in time spaced succession over a pair of conductors 54,55 to the input terminals P1 and P2 of the control unit, the spacing or period between successive signals being equal to the reciprocal of the product of the number of reluctor teeth and distributor revolutions per second.

As shown in FIG. 1, the electronic control unit 11 comprises a number of semi-conductor stages including an input stage 60, a variable anti-dwell or pulse width control stage 62, a predriver stage 64, a driver stage 66 and an output stage 68, of which the stages 60, 64, 66 and 68 are transistors of like conductivity type.

Input stage semiconductor 60 is a high gain NPN transistor connected in a grounded emitter configuration with its collector connected through supply resistor 70 to B+ bus 72, which is connected through the ignition switch 32 to the vehicle storage battery 34. A pair of diodes, labelled D1 and D2 and poled as shown, are provided in the input to transistor 60. Diode D1 is connected between the base electrode of transister 60 and the pick-up input terminal P1, and diode D2 is connected across the base and emitter electrodes of transistor 60, as shown. Biasing current, rendering transistor 60 normally conductive, is supplied to its base electrode from supply bus 72, resistor 76, conductor 75 and resistor 74.

Semiconductor device 62 of the anti-dwell or pulse width determining stage is a conduction latching device, such as a complementary silicon control rectifier (SCR), also known as a programmable unijunction transistor, having an anode, a gate and a grounded cathode electrode and is connected in a form of one-shot or mono-stable multi-vibrator circuit with the following components in the following manner. At its anode SCR 62 is connected to the junction of resistor 70 with the collector electrode of transistor 60 and to one side of a capacitor 77, while its gate electrode is connected to the junction of a voltage divider network comprised of resistors 78,80 connected in series across B+ bus 72 and reference ground. The other side of capacitor 77 is connected to the input or control electrode of semiconductor device 64 and to the ungrounded side of resistor 82.

Predriver stage semiconductor device 64 is shown as an NPN transistor connected in a grounded emitter configuration with its collector connected to supply resistor 76 and to one side of resistor 84, which couples the predriver stage to the driver stage. Resistor 84 serves primarly, however, to determine the triggering sensitivity of the circuit as described later herein.

Semiconductor 66 in the driver stage also is an NPN transistor device and is connected as an emitter-follower with its base electrode connected to the other side of the current limiting resistor 84 and its emitter electrode connected to the junction of the input or control electrode of the output stage 68 with the ungrounded side of emitter resistor 86. Operating potential is supplied to the collector of driver transistor 66 from bus 72 through resistor 88, the collector electrode of transistor 66 also being connected through resistors 90 and 92 to the collector electrode of the output stage transistor 68. A Zener diode element 94 is connected between the junction of the resistors 90 and 92 and the base input electrode of the output transistor 68.

Output stage 68 is a switching type NPN power transistor, which is mounted on a heat sink externally of and on the casing of the electronic control unit 11 for heat dissipation purposes. Its collector and grounded emitter electrode are connected in energizing circuit controlling relation in series with the primary winding of the ignition coil as shown. Capacitor 96, connected across the collector and emitter electrodes of the output transistor 68, absorbs the ignition coil leakage reactance energy and reduces heating of transistor 68.

Typical values for the components of the control unit are listed below.

| | |
|---|---|
| Resistor 70 | 820 ohms |
| Resistors 74, 82, 90 | 3.3K ohms |
| Resistor 76 | 68 ohms |
| Resistors 78, 80 | 10K ohms |
| Resistor 84 | 10 ohms |
| Resistor 86 | 47 ohms |
| Resistor 88 | 5 ohms |
| Resistor 92 | 560 ohms |
| Capacitor 77 | 1.5 micro-farads |
| Capacitor 96 | 0.22 micro-farads |
| Diodes D1, D2 | 100 v. p.i.v. |
| Zener 94 | 200 v. |

Turning now to the operation of the system, oscillograms of the triggering signals or pulses and of the voltage wave shapes at various identified points A-E in the circuit of the electronic control unit 11 are shown in FIGS. 4 and 5. FIG. 4 represents the wave forms occurring at a low engine idling speed of about 1,000 rpm (or 500 distributor rpm) and is presented on a horizontal timing scale of 2 milli-seconds per division, while FIG. 5 represents the wave forms at a high engine speed of 6,000 rpm (or 3,000 distributor rpm) and is presented on a horizontal timing scale of 0.5 msec./division.

In the absence of a triggering pulse applied to the electronic control unit 11, the quiescent status of the various stages thereof, will be as follows: Transistor 60 will be conducting, base current being supplied thereto from bus 72 through resistors 76 and 74. Semiconductors 62 and 64 will be off. Transistors 66 will be on, its base being supplied from bus 72 through resistors 76 and 84, and will supply transistor 68 with base current. Therefore, transistor 68 will be on and a quantity of current, limited by the resistance of the ballast resistor 31 and the primary ignition coil winding 22, will flow through the ignition coil.

FIGS. 4A and 5A illustrate the wave forms of the signal voltage induced in the pick-up coil as appearing at point A in FIG. 1 and affected by the action of the input circuit of the electronic control unit. During the positive alternation of the generated pick-up voltage, diode D1 is back-biased so that no current flows in the pick-up coil. The voltage drop across the base-emitter junction of normally conducting transistor 60 will clamp the voltage at the base thereof and back biases diode D2. Current is allowed to flow in the pick-up coil only during the negative alternation of the pick-up voltage, which is then clamped at approximately minus 1 v. by the action of the series combination of the diodes D1 and D2 connected across the pick-up coil. Diode D1 corrects for the offset voltage (Vbe) of transistor 60 and causes it to switch at essentially 0v. across the pick-up coil thereby increasing the sensitivity of the input circuit and assuring reliable triggering even at low level pickup voltages as encountered at engine cranking.

At time $t_o$, a tooth of the rotating reluctor wheel 40 is located just opposite the core tip of the pick-up, decreasing the gap therebetween to a minimum so that the magnetic field has attained its peak or maximum value. Since the voltage induced in the pick-up coil is determined by the time derivative or rate of change of its associated magnetic field, the induced voltage, therefore, is passing through zero and changing sign from + to −. As the pick-up voltage becomes negative, it begins to draw current through diode D1 from resistor 74, causing the base of transistor 60 to be deprived of current so that it starts to turn off. The potential at the collector of transistor 60 rises and capacitor 77 commences to charge as shown at FIG. 4B by current supplied thereto over a charging circuit through resistor 70 and the base to emitter junction of transistor 64. Transistor 64 thus turns on, dropping its collector voltage to nearly zero, so that resistor 74 can no longer supply current to the base of transistor 60. Therefore, transistor 60 shuts off completely and remains off, regardless of pick-up behaviour, until the next triggering cycle some time thereafter. The described shut-off action of transistor 60 is of a regenerative nature, assuring quick and positive shut-off thereof and triggering of the circuit even at low cranking speeds where pick-up voltage may be quite irregular.

With predriver stage transistor 64 now turned on, transistor 66 is deprived of base current and shuts off, resulting in turning off of the output stage transistor 68 and interrupting the flow of ignition coil primary current. The flux through the ignition coil begins to decay and induces voltages across the primary and secondary windings, the induced secondary voltage attaining a magnitude sufficient to fire a plug. The secondary current associated with this discharge reduces the decay of the ignition coil field to an equilibrium value, dropping the primary and the secondary voltages to lower values during the anti-dwell or off time of the ignition system.

At the time $t_1$, determined by the parameter values of the components 70, 77, 78/80, and 82, capacitor 77 has charged to a voltage level of about 8 volts in FIG. 4B, raising the anode voltage of semi-conductor voltage latching device 62 above the voltage at the junction of the voltage divider 78,80 to fire SCR 62 which is a complementary SCR in the illustrated version of the circuit. Capacitor 77 thus starts to discharge over a discharge circuit path now provided from the + side of capacitor 77 and through the anode-cathode path of SCR 62 and resistor 82 to the negative side of the capacitor. The voltage at the base of pre-driver transistor 64 drops to a negative value below zero, as shown in FIG. 4C. Transistor 64, thus promptly turns off and remains off all during the discharge period of C77. When transistor 64 turns off, transistors 66 and 68 turn on, terminating the anti-dwell period, which extends from to − $t_1$, and primary current once again flows in the ignition coil.

At a time just subsequent to time $t_1$, SCR 62 is still on and capacitor 77 is still discharging. As the next tooth of the reluctor wheel approaches the pick-up coil and the voltage induced therein starts to rise in a positive direction, transistor 60 turns on at a time corresponding approximately to $t_2$. With transistor 60 turned on, the voltage at its collector and at the anode of SCR 62 drops as shown in FIG. 4B to such a low value that the SCR 62 is extinguished. With SCR 62 shut off, the remaining charge on capacitor 77 then discharges through transistor 60 and resistor 82, as depicted by the slight rise in the negative direction at approximately time $t_2$ of the discharge wave form of FIG. 4C.

At time $t_3$, the aforesaid next tooth of the reluctor wheel is just opposite the stator core of the pick-up coil, and the voltage induced in the pick-up coil is again passing through zero from + to −. Current once again starts to flow in the pick-up coil to turn transistor 60 off, terminating the dwell period $d$, which extends from $t_1$ to $t_3$, and triggering the next firing cycle.

The wave forms of FIG. 5 are generally similar to FIG. 4, except that at high engine speed typified by FIG. 5, capacitor 77 has less time to discharge than at low speed operation and will have some charge remaining thereon at the time, $t_3$, that the next triggering cycle begins, as ascertained by comparision of FIGS. 4C and 5C. Because of the charge remaining on capacitor 77, it starts to charge from an elevated voltage level and, in consequence, it takes less time at high speeds than at low speeds to charge to the value at which SCR 62 turns on, as shown in FIG. 5C. Therefore, the anti-dwell time $\overline{d}$ is reduced and is shorter at high speed, than at low speed operation. At low speed operation, the anti-dwell time is determined primarily by the charging constant period of resistor 70 and capacitor 77. However, at high speeds, the magnitude of the discharge resistor 82, which determines the rate of dissipation of charge from capacitor 77, affects the anti-dwell period and should provide a discharge time constant with capacitor 77 that is at least equal to and in the order to the period between successive signal voltage pulses supplied from the distributor at high speed operation of the engine.

In the illustrated embodiment of the present invention, the time constant of the discharge circuit path is approximately four times that of the charging circuit path. Relative to the engine ignition cycle, the discharge time constant is of greater duration than the period between successive pulses developed by the pick-up device at the maximum or highest operating speed of the engine and is of lesser duration than the period between successive pulses at low speed operation of the engine.

By reason of its variable anti-dwell period characteristic, the ignition controller of the present invention does not comprise the selection of the anti-dwell period of the ignition system at low engine speed operation where the anti-dwell period may be selected to be of sufficient length, say at least 1.0 ms. or more, to provide an arc of adequate duration for minimum vehicle exhaust emissions. At high engine speeds, where arc duration has little effect on engine operation and exhaust emissions, the shortened anti-dwell period afforded by the present invention advantageously results in less dissipation of energy from the ignition coil each firing cycle. Additionally, the shorter high speed anti-dwell period $\overline{d}$ results in a correspondingly lengthened or increased high speed dwell period $d$ over that afforded by a system which provides a fixed anti-dwell period over substantially the entire speed range of engine operation. Consequently the ignition coil used with the controller of the present invention enjoys a relatively longer charging duration from the source than that afforded by such fixed period systems. Therefore, it can store the requisite amount of energy therein for efficient sparking of the engine at a relatively low level of current drawn by the coil. Thus, the controller of the present invention can use a standard ignition coil of the same type employed with a conventional breaker point system in distinction to the special coils which are usually employed with prior forms of solid state ignition systems providing a fixed anti-dwell period.

Because of the fixed anti-dwell period characteristic of these prior forms of ignition systems, the ignition coils employed therewith use a reduced number of primary turns to attain a higher transformer turns ratio. The higher turns ratio enables an increased output voltage to be obtained therefrom in order to charge the special coil over the shortened high speed dwell period of the system to a level to store sufficient energy therein to fire the plug. However, this energy corresponds to a higher current level in the primary and results in undesirably increased current and power drain from the storage battery.

In accordance with another feature of the invention, the protective circuit containing the resistors 90,92 and Zener diode Z provides optimum protection to the output transistor 68 from the excessive voltage which might appear at its collector during an unloaded or open circuited secondary condition of the ignition coil. Under this condition, if the voltage at the collector of transistor 68 rises above a certain value at the time the output stage is turned off, the voltage at the junction of the voltage divider 90,92 reaches the breakdown voltage of the Zener diode and it begins to pass current into the base of transistor 68. Transistor 68 thus turns on slightly and draws collector current, which limits the collector voltage appearing at point O to a safe value, as depicted by the dotted waveform of the signal in FIG. 5E.

It will be further noted that the protective circuit is connected through resistor 90 to point 97 whose potential is nearly that of the supply voltage. Therefore, the Zener diode breaks down at a lower voltage at the collector of transistor 68 with an increased level of supply voltage as may occur during higher voltage booster battery starting conditions, for example. Since the amount of energy a transistor can safely dissipate without breakdown is inversely proportional to its collector voltage, the described action of the protective circuit, which enables the Zener to breakdown at lower collector voltages with increased supply voltage, advantageously permits the output transistor to absorb the greater amount of energy stored in the ignition coil at increased supply voltages and protects it from breakdown.

Another attribute of the subject controller is its relatively low timing lag, which is defined as the occurrence of a spark at a more retarded angle with respect to the mechanical governor, with speed, or, more generally, the time required to build up enough current in the pick-up coil to trigger the circuit. In general, the larger the inductance of the pick-up coil, the greater the lag. Timing lag is minimized in the apparatus of the present invention by the configuration of the input circuit in which there is no current flow and, therefore, no field in the pick-up coil immediately prior to triggering due to the blocking action of diode D1. In consequence, there is no reversal of current in the pick-up at the time of triggering, and little or no voltage is induced due to its inductance to oppose the build up of current and field therein during the negative alternation of the pick-up voltage. Thus, the inductance of the pick-up coil introduces very little delay.

The exact amount of current required to trigger the circuit is related to the voltage across resistor 84, which is related to supply voltage less the fixed offset voltage Vbe of transistor 66. Resistor 84 permits the voltage at the collector of transistor 64 to vary with supply voltage. As the supply voltage increases, so does the current supplied to the base of transistor 60, driving it deeper into saturation. Thus in order to turn off transistor 60 more current must be shunted therefrom and drawn by the pick-up coil at higher supply voltages than at lower supply voltages. The net effect is to make the input circuit less sensitive as supply voltage increases and more sensitive as supply voltage decreases. This inverse triggering sensitivity to supply voltage relationship advantageously increases triggering sensitivity at low supply voltages, where cranking speed is slow and the induced pick-up voltage is low and quite erratic, and decreases the susceptibility of the circuit to to spurious triggering at higher supply voltages where cranking speeds are much higher or during the run mode of the ignition system.

In addition to the effect on the triggering of the input circuit, the diode D1 in conjunction with diode D2 provides a protective function therefor should the negative voltage output of the ignition coil arc inside the distributor cap to the pick-up coil and/or to the leads thereof. In such event, the flashover energy is harmlessly dissipated in the diodes D1 and D2 which become forward based and protect the vulnerable input transistor 60 against damage. Diode D2 clamps the base-emitter junction of the input transistor 60 against such negative transients and from high negative level signal voltages from the pick-up that would reverse bias the base-emitter junction and possibly damage transistor 60.

The described circuit also offers a measure of protection against misconnection of the pick-up coil terminal to the battery and also against a reversed battery connection. In the former case, the input transistor is protected by diode D1 and, in the latter, the various semiconductors go into non-damaging quasi-modes, which maintain the voltage on electrolytic capacitor 77 in the correct polarity.

What is claimed is:

1. Apparatus for controlling the anti-dwell firing period of the ignition cycle of an internal combustion engine electrical ignition system having a source of electrical energy, at least one sparking device and an ignition coil having a primary winding connected for energization from said source and another winding for supplying high tension energy to said sparking device;
   said apparatus including a pickup device driven in synchronism with the engine and developing a triggering signal voltage for each ignition cycle of the engine and an electronic control unit actuated from said pickup device and controlling the energization of said ignition coil from said electrical energy source, said control unit including
   a first and a second transistor each having emitter, collector and base electrodes of which the base and emitter electrodes of the first transistor are coupled to said pickup device;
   a capacitor connected between the collector of said first transistor and the base of said second transistor;
   a charging circuit for said capacitor including the base and emitter electrodes of said second transistor connected to one side of said source and a first resistor connected between the collector of said first transistor and the other side of said source;
   a discharging circuit for said capacitor including a second resistor connected between the emitter and base of said second transistor and a voltage latching conduction device connected across the collector and emitter electrodes of said first transistor to said one side of said source;
   and a controllable semi-conductor switching device having a pair of output electrodes connected in series with said ignition coil primary winding across said source and an input control electrode coupled to the collector electrode of said second transistor.

2. Apparatus in accordance with claim 1 wherein the time constant of said capacitor and second resistor is in the order of the period of an ignition cycle at high speed operation of the engine and is less than the period of an ignition cycle at low speed engine operation.

3. Apparatus according to claim 22 including
   a third resistor connected between the collector electrode of said second transistor and the said other side of said source and
   a regenerative d.c. feedback circuit connected between the collector electrode of said second transistor to the base electrode of said first transistor device.

4. Apparatus in accordance with claim 1 wherein said pick-up device is of a magnetic character and has a stator portion which includes a pick-up coil having a pair of terminals and has a rotor portion which includes a reluctor element for developing a bipolar signal voltage in said pick-up coil for each ignition cycle of the engine, and wherein said control unit further includes
   a first diode connected across the base-emitter electrodes of said first transistor device and a second diode connected in series from one side of said first diode to one terminal of said pick-up coil, the other terminal of said pick-up coil being connected to the other side of said first diode, said diodes being similarly poled in a direction to oppose current flow in said pick-up coil during one alternation of said signal voltage.

5. Apparatus in accordance with claim 1 wherein said voltage latching conduction device is an SCR having anode, cathode and gate electrodes of which its anode and cathode electrodes are connected across the collector-emitter electrodes of said first transistor device and its gate electrode is connected to receive a reference potential applied thereto intermediate the potential level of said source.

6. Apparatus in accordance with claim 5 wherein said reference potential is taken from the junction of a voltage divider connected across said source of energy.

7. Apparatus in accordance with claim 1 wherein the charging interval of said capacitor is less at high speed than at low speed operation of the engine.

8. Apparatus in accordance with claim 1 wherein the charging interval of said capacitor determines the anti-dwell firing period and varies inversely with engine speed.

9. Apparatus in accordance with claim 1 wherein said control unit further includes a third transistor having base, emitter and collector electrodes of which its base electrode is direct current conductively connected to the collector electrode of said second transistor and its emitter electrode is d.c. coupled to the input control electrode of said controllable semi-conductor switching device.

10. Apparatus in accordance with claim 9 wherein the collector electrode of said second transistor is connected to the base electrode of said thride transistor through a resistor whose ohmic value inversely affects the relation between the triggering sensitivity of the circuit and the source supply voltage.

11. Apparatus in accordance with claim 9 wherein said controllable semi-conductor switching device is also a transistor of the same conductivity type as said first, second and third transistors.

12. Apparatus in accordance with claim 11 wherein said transistors are NPN transistors and said voltage conduction latching device is a complementary SCR.

13. Apparatus in accordance with claim 11 including a Zener diode element connected in circuit between the base electrode and the collector electrode of said controllable semi-conductor transistor switching device.

14. Apparatus in accordance with claim 11 including a voltage divider connected between the collector electrodes of said third transistor and said controllable semi-conductor transistor switching device and a Zener diode connected between the junction of said voltage divider and the base electrode of said controllable semi-conductor transistor switching device.

15. Apparatus in accordance with claim 11 wherein each of said first and second transistors and said controllable semi-conductor transistor switching device is connected in a common emitter configuration and said third transistor is connected as an emitter follower.

16. In a timing circuit for timing the firing period of the ignition system of an internal combustion engine and including a source of electrical energy, at least one sparking device and an ignition coil having a primary winding energizable from said source and a secondary winding coupled to said sparking device, said circuit comprising
- an output stage semi-conductor device having a control input terminal and a pair of current conducting output terminals connected in series with the primary winding of said ignition coil across said source,
- a driver stage semi-conductor device having a control input terminal and a pair of output terminals one of which output terminals is conductively connected to one side of said source and the other is conductively connected to the other side of said source and to the control input terminal of said output stage semi-conductor device, and
- means driven by the engine for supplying control pulses to the control input terminal of said driver stage semi-conductor device to initiate the firing of the engine,
- means for protecting the output stage semi-conductor device from excessive voltages that may appear at the output terminal thereof during open circuit conditions of the ignition secondary coil including a voltage divider connected between one of the output terminals of each of said devices and a Zener diode connected between the junction of said divider and the input control terminal of said output stage semi-conductor device.

17. Apparatus for controlling the firing of an internal combustion engine ignition system having a source of electrical energy, at least one sparking device and an ignition coil having a primary winding connected for energization from the source and a high tension winding for supplying high tension energy to said sparking device, said apparatus including:
- a magnetic pickup device operated in synchronism with the engine and having a pair of output terminals across which is developed a signal voltage of alternating polarity;
- a control transistor having base, emitter and collector electrodes of which one of its emitter and collector electrodes is connected to one side of said source,
- means connecting the other of the emitter and collector electrodes of said control transistor to the other side of said source;
- means producing a biasing voltage and applying it to said base electrode of said control transistor to biassthe latter in one state of conduction thereof;
- a controllable switching device having a pair of output terminals connected in series with said ignition coil primary winding across said source and a control input terminal coupled to the collector electrode of said control transistor;
- said pickup device connected in circuit with the base and emitter electrodes of said control transistor to trigger it to its opposite state of conduction from a pickup signal voltage of one polarity; and
- a diode connected in series in said pickup and transistor base-emitter circuit and poled in a direction to prevent current flow in the pickup device during the opposite polarity of the signal voltage therefrom and in opposition to the base-emitter junction of said control transistor to compensate for the $V_{BE}$ offset voltage thereof, thereby to reduce the voltage required from the pickup to trigger said control transistor.

18. Apparatus in accordance with claim 27 including
- a second transistor having a control input terminal and a pair of output terminals, circuit means coupling the other output terminal of said control transistor to the control input terminal of said second transistor device, and
- a regenerative feedback connection from one of the output terminals of said second device to the control input terminal of said control transistor.

19. Apparatus in accordance with claim 17 above further including a second diode connected across the base and emitter electrodes of said control transistor and similarly poled and in series with said first diode.

20. Apparatus for controlling the anti-dwell firing period of the ignition cycle of an internal combustion engine ignition system having a source of direct current electrical energy, at least one sparking device and an ignition coil having a winding connected for energization from said source and another winding for supplying high tension energy to said sparking device;
- said apparatus including a pickup device driven in synchronism with the engine and developing a triggering signal for eachignition cycle and an electrical control unit actuated from said pickup device and controlling the energization of said ignition coil from said electrical source;
- said control unit comprising a charging circuit including first resistor means connected to said source and a capacitor connected to be charged from said source through said resistor means upon application of a triggering signal to said electronic control unit from said pickup device;
- a conduction latching device connected to said capacitor and said source and responsive to the attainment of a predetermined voltage charge level upon the capacitor;
- a discharge circuit including second resistor means connected in discharge circuit relation with said capacitor by said conduction latching device when said capacitor has charged to said predetermined level; and a controllable semi-conductor switching device having a pair of output electrodes connected in series with the first mentioned winding of said ignition coil across said source and a control electrode responsive to the charging and the discharging of said capacitor to interrupt the energization of the ignition coil from the source during the charging of said capacitor and restore the energization of the ignition coil from the source during the discharging of said capacitor.

21. Apparatus in accordance with claim 28 above wherein the charging interval of the capacitor determines the anti-dwell firing period of the ignition cycle and the time constant of said capacitor and said second resistor means is in the order of the period of an ignition cycle at high speed operation of the engine and is less than the period of an ignition cycle at low speed engine operation, whereby the charging interval of said capacitor is shorter at high speed than at low speed engine operation.

22. Apparatus in accordance with claim 20 wherein the discharging interval of said capacitor is greater than the charging interval thereof.

23. Apparatus in accordance with claim 20 wherein the time constant of said discharge circuit is approximately four times that of said charging circuit.

24. An electronic control unit for an internal combustion engine ignition system having a direct current source of electrical energy, at least one sparking device, an ignition coil having a primary winding connected at one side to one side of said source and a secondary winding for supplying high tension electrical energy to said sparking device, and a picup device driven in synchronism with the engine and developing a triggering signal for each ignition cycle of the engine, said electronic control unit having a pair of input terminals for connection to said pickup device;

a pair of supply terminals for connection to said energy source;

an output terminal for connection to the other side of said ignition coil primary winding;

a first and a second transistor device each having base, collector and emitter electrodes of which the base and emitter electrodes of the first transistor are coupled to said input terminals and the emitter electrodes of both said transistors are connected to one of said supply terminals;

first resistor means connected between the other of said supply terminals and the collector electrode of said first transistor;

a capacitor connected between the collectror of the first transistor and the base of the second transistor;

a capacitor charge voltage limiting device connected across the collector and emitter electrodes of said first transistor;

second resistor means connected between the base and emitter of the second transistor; and a controllable semi-conductor switching device having a controllable electrode coupled to the collector electrode of said second transistor and a pair of output electrodes connected between said output terminal and the supply terminal which is adapted to be connected to the other side of said source.

25. An electronic ignition control unit in accordance with claim 30 wherein said controllable semi-conductor switching device is a transistor having base, emitter and collector electrodes and has a zener diode connected between its base and collector electrodes.

26. An electronic ignition control unit in accordance with claim 24 including a diode connected in series between one of said input terminals and one of said base and emitter electrodes of said first transistor and poled in a direction opposite the base-emitter junction of said first transistor.

27. An electronic ignition control unit in accordance with claim 26 including a second diode connected across the base and emitter electrodes of said first transistor and in series with and similarly poled as said first diode.

28. Apparatus for controlling the anti-dwell firing period of the ignition cycle of an internal combustion engine inductive type ignition system having a source of electrical energy, at least one sparking device and an ignition coil having a primary winding connected for energization from said source and another winding for supplying high tension energy to said sparking device; said apparatus including a triggering device driven in synchronism with the engine and providing a triggering signal voltage for each ignition cycle of the engine and an electronic control unit actuated from said triggering device and controlling the energization of said ignition coil from said electrical energy source, said control unit including a first and a second transistor each having emitter, collector and base electrodes of which the base and emitter electrodes of the first transistor are coupled to said triggering device and the emitter electrodes of both of said transistors are coupled to one side of said source, a charging circuit including a first resistor connected between the collector of said first transistor and the other side of said source and a capacitor connected between the collector of said first transistor and the base of said second transistor to charge from the source upon application of a triggering signal to said first transistor, a discharging circuit for said capacitor including a second resistor connected across the emitter and base electrodes of said second transistor and a voltage latching conduction device connected across the collector and emitter electrodes of said first transistor;

and a controllable semi-conductor switching device having a pair of output electrodes connected in series with said ignition coil primary winding across said source and an input control electrode coupled to the collector electrode of said second transistor; the charging interval of said capacitor determining the anti-dwell firing period of the ignition cycle and being established at any given speed of the engine by said capacitor and first resistor, the conduction level of said voltage conduction device and any residual charge on the capacitor when said triggering signal is applied to said first transistor.

29. Apparatus for an inductive type ignition system in accordance with claim 28 wherein the residual charge on said capacitor is determined by the time constant of said capacitor and second resistor as related to the period of the ignition cycle at any given speed of the engine.

30. For use with an internal combustion engine having a source of direct current potential, at least one sparking device and an ignition coil having a winding connected for energization from said source and another winding for supplying high tension energy to said sparking device, an electronic ignition system of the inductive type producing an ignition cycle characterized by a dwell period during which said ignition coil is energized from said potential source for a time period which varies inversely with engine speed and by an anti-dwell period during which the energization of said coil is interrupted from said source of the remaining portion of said ignition cycle, said electronic ignition system inclding controllable output semi-conductor switching means connected in current controlling energization relation with said ignition coil across said potential source, means driven by the engine providing a triggering signal each igntiion cycle and commencing the anti-dwell period of the ignition cycle, capacitor timing circuit means between said triggering means and said output switching means controlling the duration of the anti-dwell period of the ignition cycle independently of the duration of said triggering signal, and timing circuit modifying means connected to said capacitor timing circuit for decreasing the duration of the anti-dwell period of the ignition cycle with increasing engine speed to correspondingly increase the dwell period of the ignition cycle at higher engine speeds.

31. An electronic ignition system in accordance with claim 30 wherein said timing circuit modifying means includes capacitor charge limiting means and capacitor discharge prolonging means.

* * * * *

UNITED STATES PATENT OFFICE
CERTIFICATE OF CORRECTION

Patent No. 3,749,974                    Dated July 31, 1973

Inventor(s)  William R. Kissel

It is certified that error appears in the above-identified patent and that said Letters Patent are hereby corrected as shown below:

Column 7, line 40, after "not" change "comprise" to -- compromise --.

Claim 3, line 1, before "including" change "22" to -- 1 --.

Claim 18, line 1, after "claim" change "27" to -- 17 --.

Claim 21, line 1, after "claim" change "23" to -- 20 --.

Claim 25, line 2, before "wherein" change "30" to -- 24 --.

Signed and sealed this 7th day of May 1974.

(SEAL)
Attest:

EDWARD M.FLETCHER,JR.
Attesting Officer

C. MARSHALL DANN
Commissioner of Patents